: US 9,330,170 B2
(45) Date of Patent: May 3, 2016

(12) United States Patent
Purang et al.

(54) RELATING OBJECTS IN DIFFERENT MEDIUMS (75) Inventors: Khemdut Purang, San Jose, CA (US); Mark Plutowski, Santa Cruz, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2041 days.

(21) Appl. No.: 11/435,633

(22) Filed: May 16, 2006

(65) Prior Publication Data

US 2007/0271264 A1 Nov. 22, 2007

(51) Int. Cl.
G06F 17/30 (2006.01)

(52) U.S. Cl.
CPC .... *G06F 17/30749* (2013.01); *G06F 17/30755* (2013.01)

(58) Field of Classification Search
USPC .......................................... 707/728
See application file for complete search history.

(56) References Cited

U.S. PATENT DOCUMENTS

| | | | |
|---|---|---|---|
| 5,566,291 A | 10/1996 | Boulton et al. |
| 5,764,239 A | 6/1998 | Misue et al. |
| 5,963,746 A | 10/1999 | Barker et al. |
| 6,105,046 A | 8/2000 | Greenfield et al. |
| 6,208,963 B1 | 3/2001 | Martinez et al. |
| 6,256,648 B1 | 7/2001 | Hill et al. |
| 6,282,548 B1 | 8/2001 | Burner et al. |
| 6,373,484 B1 | 4/2002 | Orell et al. |
| 6,460,036 B1 | 10/2002 | Herz |
| 6,473,851 B1 | 10/2002 | Plutowski |
| 6,484,199 B2 | 11/2002 | Eyal |
| 6,513,027 B1 | 1/2003 | Powers et al. |
| 6,539,354 B1 | 3/2003 | Sutton et al. |
| 6,545,209 B1 | 4/2003 | Flannery et al. |
| 6,584,456 B1 | 6/2003 | Dom et al. |
| 6,592,627 B1 | 7/2003 | Agrawal et al. |
| 6,625,585 B1 | 9/2003 | MacCuish et al. |
| 6,668,273 B1 | 12/2003 | Rust |
| 6,714,897 B2 | 3/2004 | Whitney et al. |
| 6,732,145 B1 | 5/2004 | Aravamudan et al. |
| 6,738,678 B1 | 5/2004 | Bharat et al. |
| 6,748,418 B1 | 6/2004 | Yoshida et al. |
| 6,785,688 B2 | 8/2004 | Abajian et al. |
| 6,801,229 B1 | 10/2004 | Tinkler |
| 6,941,300 B2 | 9/2005 | Jensen-Grey |
| 6,996,575 B2 | 2/2006 | Cox et al. |
| 7,003,515 B1 | 2/2006 | Glaser et al. |
| 7,085,736 B2 | 8/2006 | Keezer et al. |
| 7,158,983 B2 | 1/2007 | Willse et al. |
| 7,162,691 B1 | 1/2007 | Chatterjee et al. |
| 7,165,069 B1 | 1/2007 | Kahle et al. |
| 7,184,968 B2 | 2/2007 | Shapiro et al. |
| 7,185,001 B1 | 2/2007 | Burdick et al. |
| 7,203,698 B2 | 4/2007 | Yamashita |
| 7,216,129 B2 | 5/2007 | Aono et al. |

(Continued)

OTHER PUBLICATIONS

Pavel Moravec, Michal Kolovrat, and Vaclav Snasel, "LSI vs. Wordnet Ontology in Dimension Reduction for Information Retrieval", 2004, pp. 18-26, ISBN 80-248-0457-3.

(Continued)

*Primary Examiner* — Hosain Alam
*Assistant Examiner* — Tuan-Khanh Phan
(74) *Attorney, Agent, or Firm* — Haverstock & Owens LLP (57) ABSTRACT

Metadata associated with a first multimedia object in a first medium is used to find a second multimedia object in a second medium. The metadata includes category data.

20 Claims, 8 Drawing Sheets

(56) References Cited

U.S. PATENT DOCUMENTS

| | | |
|---|---|---|
| 7,325,006 B2 | 1/2008 | Fortnan et al. |
| 7,330,850 B1 | 2/2008 | Seibel et al. |
| 7,340,455 B2 | 3/2008 | Platt et al. |
| 7,371,736 B2 | 5/2008 | Shaughnessy et al. |
| 7,392,248 B2 | 6/2008 | Bakalash et al. |
| 2001/0045952 A1 | 11/2001 | Tenev et al. |
| 2002/0035603 A1 | 3/2002 | Lee et al. |
| 2002/0042793 A1 | 4/2002 | Choi |
| 2002/0099696 A1 | 7/2002 | Prince |
| 2002/0099731 A1 | 7/2002 | Abajian |
| 2002/0099737 A1 | 7/2002 | Porter et al. |
| 2002/0107827 A1 | 8/2002 | Benitez-Jimenez et al. |
| 2002/0138624 A1 | 9/2002 | Esenther |
| 2003/0011601 A1 | 1/2003 | Itoh et al. |
| 2003/0033318 A1 | 2/2003 | Carlbom et al. |
| 2003/0041095 A1 | 2/2003 | Konda et al. |
| 2003/0041108 A1 | 2/2003 | Henrick et al. |
| 2003/0084054 A1 | 5/2003 | Clewis et al. |
| 2003/0089218 A1 | 5/2003 | Gang et al. |
| 2003/0105819 A1 | 6/2003 | Kim et al. |
| 2003/0154181 A1 | 8/2003 | Liu et al. |
| 2003/0217335 A1 | 11/2003 | Chung et al. |
| 2004/0083236 A1 | 4/2004 | Rust |
| 2004/0090439 A1 | 5/2004 | Dillner |
| 2004/0117367 A1 | 6/2004 | Smith et al. |
| 2004/0133555 A1 | 7/2004 | Toong et al. |
| 2004/0133639 A1 | 7/2004 | Shuang et al. |
| 2004/0193587 A1 | 9/2004 | Yamashita |
| 2004/0215626 A1 | 10/2004 | Colossi et al. |
| 2004/0260710 A1 | 12/2004 | Marston et al. |
| 2005/0027687 A1 | 2/2005 | Nowitz et al. |
| 2005/0033807 A1 | 2/2005 | Lowrance et al. |
| 2005/0060350 A1 | 3/2005 | Baum et al. |
| 2005/0114324 A1* | 5/2005 | Mayer ............ 707/3 |
| 2005/0289109 A1* | 12/2005 | Arrouye et al. ............ 707/1 |
| 2005/0289168 A1 | 12/2005 | Green et al. |
| 2006/0023724 A1 | 2/2006 | Na et al. |
| 2006/0025175 A1 | 2/2006 | Lapstun et al. |
| 2006/0112141 A1* | 5/2006 | Morris ............ 707/104.1 |
| 2006/0122819 A1 | 6/2006 | Carmel et al. |
| 2006/0167942 A1 | 7/2006 | Lucas et al. |
| 2006/0218153 A1 | 9/2006 | Voon et al. |
| 2006/0282789 A1 | 12/2006 | Kim |
| 2007/0005581 A1* | 1/2007 | Arrouye et al. ............ 707/4 |
| 2007/0061319 A1 | 3/2007 | Bergholz |
| 2007/0130194 A1* | 6/2007 | Kaiser ............ 707/102 |
| 2007/0192300 A1 | 8/2007 | Reuther et al. |
| 2007/0233730 A1 | 10/2007 | Johnston |
| 2007/0245373 A1 | 10/2007 | Shivaji-Rao et al. |
| 2008/0133466 A1 | 6/2008 | Smith et al. |
| 2008/0301121 A1 | 12/2008 | Suzuki et al. |
| 2008/0313214 A1 | 12/2008 | Duhig et al. |

OTHER PUBLICATIONS

Ana B. Benitez, John R. Smith, Shih-Fu Chang, "MediaNet: A Multimedia Information Network for Knowledge Representation", in Proc., SPIE, 2001.

Lawrence Reeve and Hyoil Han, "Semantic Annotation for Semantic Social Networks", Using Community Resources, AIS SIGSEMIS Bulletin, vol. 2, Issue (3&4), 2005, pp. 52-56.

Maria Ruiz-Casado, Enrique Alfonseca and Pablo Castells, "Automatic Extraction of Semantic Relationships for WordNet by Means of Pattern Learning From Wikipedia", Castelis in Lecture Notes in Computer Science, vol. 3513, 2005.

George A. Miller, Richard Beckwith Christiane Fellbaum, "Introduction to WordNet: An On-Line Lexical Database", Int. J. Lexicography, 1990, vol. 3, pp. 235-244.

Sebastian, F., "Machine Learning in Automated Text Categorization", Mar. 2002, ACM, vol. 34, Issue 1, pp. 1-47.

Chen, et al., "Predicting Category Accesses for a User in a Structured Information Space", Aug. 2002, ACM, pp. 65-72.

* cited by examiner

FIG. 1A

| |
|---|
| 8498618 <br> 152 |
| 0TopOntology-Company-BroadcastStation-TVTokyo <br> 154 |
| 0TopOntology-0RegionAsia-Japan <br> 156 |
| Best, Underway, Sports, GolfCategory, Golf, Art, 0SubCulture, Animation, Family, FamilyGeneration, Child, Kids, Family, FamilyGeneration, Child <br> 158 |
| Kids, Cartoon <br> 160 |
| 20040410 <br> 162 |
| 0930 <br> 164 |
| 1000 <br> 166 |
| 30 <br> 168 |
| Artist$_1$, Artist$_2$, ..., Artist$_N$ <br> 170 |

RELATING OBJECTS IN DIFFERENT MEDIUMS

RELATED APPLICATIONS

This patent application is related to a co-pending U.S. Patent Application, entitled "Sorting Media Objects By Similarity", Ser. No. 11/435,494, assigned to the same assignees as the present application.

TECHNICAL FIELD

This invention relates generally to multimedia, and more particularly finding relationships among various multimedia objects.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2005, Sony Electronics, Incorporated, All Rights Reserved.

BACKGROUND

Clustering and classification tend to be important operations in certain data mining applications. For instance, data within a dataset may need to be clustered and/or classified in a data system with a purpose of assisting a user in searching and automatically organizing content, such as recorded television programs, electronic program guide entries, and other types of multimedia content.

Generally, many clustering and classification algorithms work well when the dataset is numerical (i.e., when datum within the dataset are all related by some inherent similarity metric or natural order). Numerical datasets often describe a single attribute or category. Categorical datasets, on the other hand, describe multiple attributes or categories that are often discrete, and therefore, lack a natural distance or proximity measure between them.

Given that a user is interested in an object in a first medium, it is desirable to find objects in a different medium that the user might be interested in. For example, if the user is interested in a musical artist, it may be desirable to retrieve movies in which the musical artist's songs appear.

SUMMARY

Metadata associated with a first multimedia object in a first medium is used to find a second multimedia object in a second medium. The metadata includes category data.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
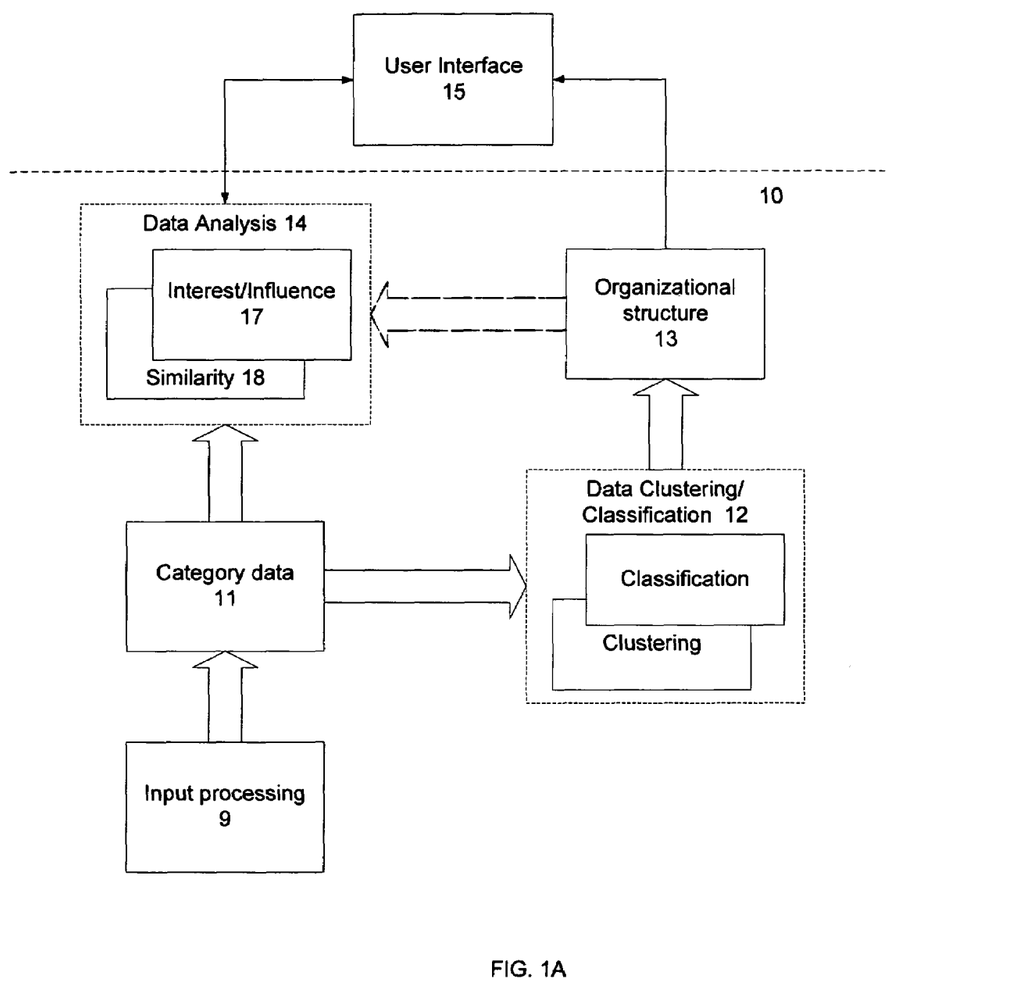
FIG. 1A illustrates one embodiment of a multimedia database system.

FIG. 1A is a diagram of a data system 10 that enables automatic recommendation or selection of information, such as content, which can be characterized by category data 11. Category data describes multiple attributes or categories. Often the categories are discrete and lack a natural similarity measure between them. Thus, category databases could be sparse because of the discreteness of the categories. Examples of category data include electronic program guide (EPG) data, and content metadata.

The category data 11 is grouped into clusters, and/or classified into folders by the clustering/classification module 12. Details of the clustering and classification performed by module 12 are below. The output of the clustering/classification module 12 is an organizational data structure 13, such as a cluster tree or a dendrogram. A cluster tree may be used as an indexed organization of the category data or to select a suitable cluster of the data.

Many clustering applications require identification of a specific layer within a cluster tree that best describes the underlying distribution of patterns within the category data. In one embodiment, organizational data structure 13 includes an optimal layer that contains a unique cluster group containing an optimal number of clusters.

A data analysis module 14 may use the folder-based classifiers and/or classifiers generated by clustering operations for automatic recommendation or selection of content. The data analysis module 14 may automatically recommend or provide content in a first medium that may be of interest to a user or otherwise similar or related to content used by a user in a different medium.

In one embodiment, a user identifies multiple folders of category data records that categorize specific content items, and the data analysis module 14 assigns category data records for new content items with the appropriate folders based on similarity. In another embodiment, data analysis module 14 comprises similarity module 18 that automatically determines cross-media object relations. Determining cross-media object relations is further described in FIGS. 3-6 below.

A user interface 15 also shown in FIG. 1A is designed to assist the user in searching and automatically organizing content using the data system 10. Such content may be, for example, recorded TV programs, electronic program guide (EPG) entries, and multimedia content.

Clustering is a process of organizing category data into a plurality of clusters according to some similarity measure among the category data. The module 12 clusters the category data by using one or more clustering processes, including seed based hierarchical clustering, order-invariant clustering, and subspace bounded recursive clustering. In one embodiment, the clustering/classification module 12 merges clusters in a manner independent of the order in which the category data is received.

In one embodiment, the group of folders created by the user may act as a classifier such that new category data records are compared against the user-created group of folders and automatically sorted into the most appropriate folder. In another embodiment, the clustering/classification module 12 implements a folder-based classifier based on user feedback. The folder-based classifier automatically creates a collection of folders, and automatically adds and deletes folders to or from the collection. The folder-based classifier may also automatically modify the contents of other folders not in the collection.

In one embodiment, the clustering/classification module 12 may augment the category data prior to or during clustering or classification. One method for augmentation is by imputing attributes of the category data. The augmentation may reduce any scarceness of category data while increasing the overall quality of the category data to aid the clustering and classification processes.

Records are represented within the data system 10 as data vectors. The dimension of each vector corresponds to the total number of terms characterizing all attributes found in all records processed by the system (i.e., the global vocabulary of the system). Values assigned to components of a vector represent the presence of a term within a corresponding record. For example, a vector component can be represented in a binary fashion as either a 0 (indicating the absence of a term from a record) or a 1 (indicating the presence of a term in a record).

Although shown in FIG. 1A as specific separate modules, the clustering/classification module 12, organizational data structure 13, and the data analysis module 14 may be implemented as different separate modules or may be combined into one or more modules.

Figure 1B:
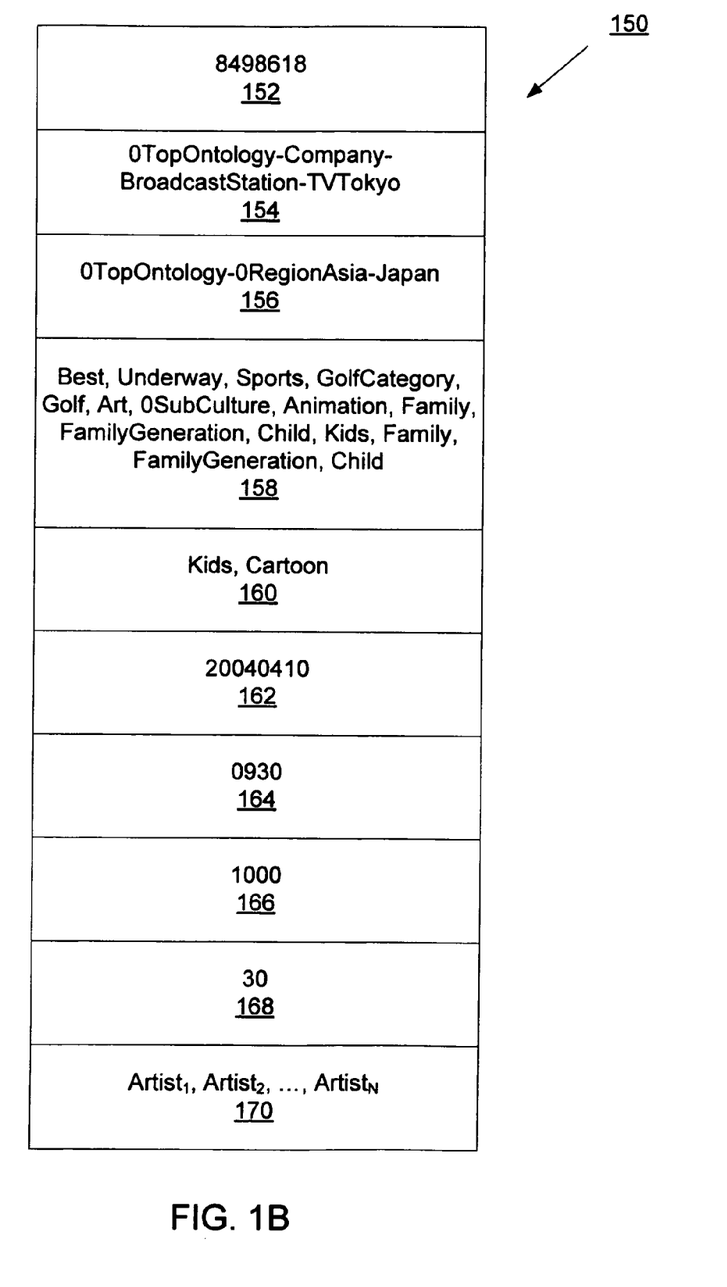
FIG. 1B illustrates one embodiment of program metadata.

FIG. 1B illustrates one embodiment of program metadata 150. Program metadata 150 is information that describes content used by data system 10. In FIG. 1B, program metadata comprises program identifier 152, station broadcaster 154, broadcast region 156, category data 158, genre 160, date 162, start time 164, end time 166, duration 168, and artists 170. Program identifier 152 identifies the content used by data system 10. Station broadcaster 154 and broadcast region 156 identify the broadcaster and the region where content was displayed. In addition, program metadata 150 identifies the date and time the content was displayed with date 162, start time 164, end time 166. Duration 168 is the duration of the content. Furthermore, genre 160 describes the genre associated with the content.

Category data describes the different categories associated with the content. For example, category data 158 comprises terms: Best, Underway, Sports, GolfCategory, Golf, Art, 0SubCulture, Animation, Family, FamilyGeneration, Child, Kids, Family, FamilyGeneration, and Child. As illustrated, category data 158 comprises fifteen terms describing the program. Some of the terms are related, for example, "Sports, GolfCategory, Golf" are related to sports, and "Family, FamilyGeneration, Child, Kids", are related to family. Furthermore, category data 158 includes duplicate terms and possibly undefined terms (0SubCulture). Undefined terms may be only associated with one program, because the definition is unknown and, therefore, not very useful.

Artists 170 comprise the list of artists associated with the program. For example, artists 170 comprise $artist_1$, $artist_2, \ldots, artist_N$. An artist can be, but not limited to, an actor, actress, producer, director, singer, musician, arranger, composer, choreographer, painter, illustrator, author, etc., and/or any person who adds to the creative content of the program.

According to an embodiment of the present invention, objects that belong to different types of multimedia are related together. Accordingly, for instance, given a song that a user is interested in, the artist(s) of the song is related to one or more movies by looking at the music that appears in the movies' soundtrack. For example, the song "Birthday" that is written by Paul McCartney and John Lennon may be used to find movies in which Paul McCartney's and John Lennon's songs appear.

Further, according to an embodiment of the present invention, objects that belong to different types of multimedia are related together, even when there is no direct connection between the objects. Accordingly, for example, a musical artist is related to one or more movies by looking at the music that appears in the movies' soundtracks, even when the musical performer did not perform in any of the songs that appear in the movies' soundtracks.

Figure 2:
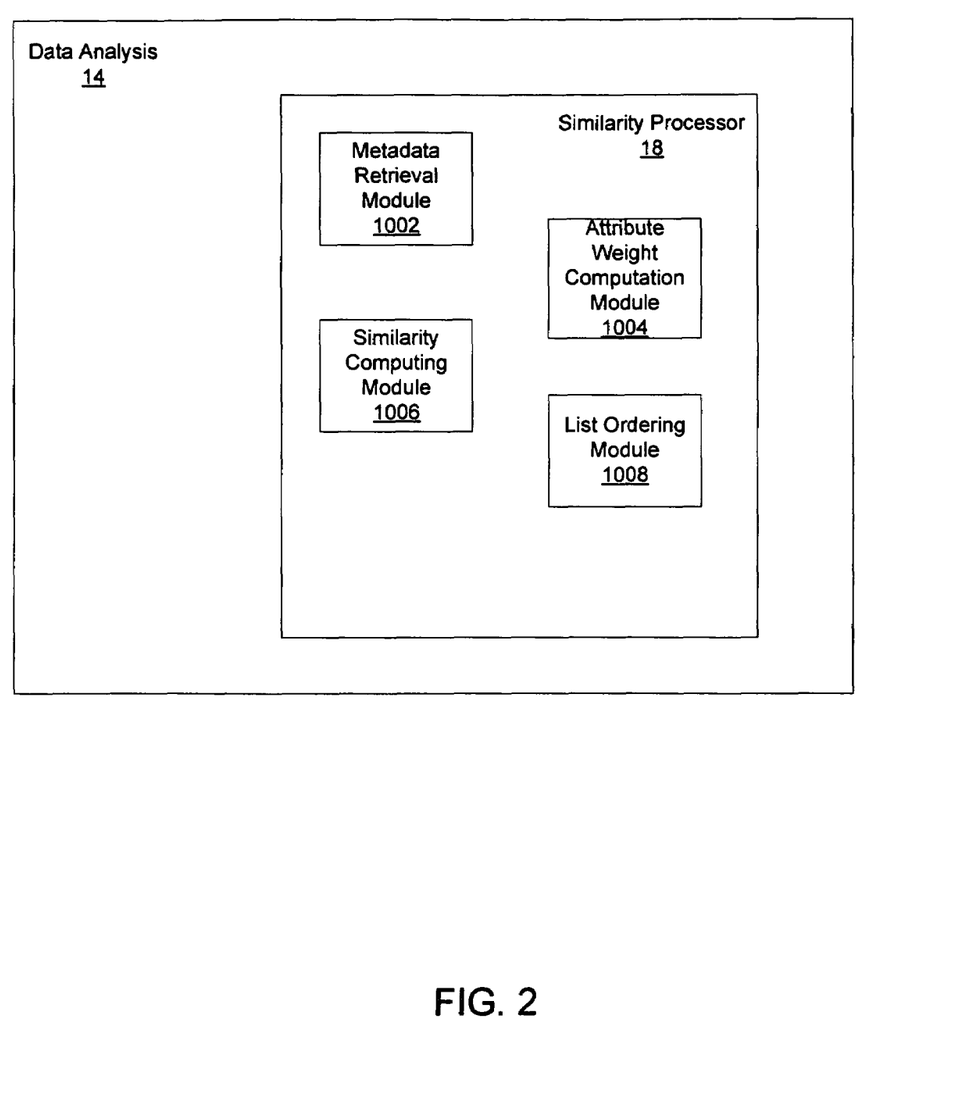
FIG. 2 is a block diagram illustrating one embodiment of a device that sorts media objects by similarity.

According to an embodiment of the present invention, a filtering system is provided that presents the user with movies of potential interest based on the user's interest in musical artists. FIG. 2 is a block diagram illustrating one embodiment of a device that sorts media objects by similarity and can be used to relate multimedia objects across various mediums. In one embodiment, data analysis module 14 contains interest/influence module 17. Alternatively, data analysis module 14 does not contain interest/influence module 17, but is coupled to interest/influence module 17. Interest/influence module 17 comprises metadata retrieval module 1002, attribute weight computation module 1004, similarity computing module 1006, and list ordering module 1008. Metadata retrieval module 1002 retrieves metadata from the category data 10. Attribute weight computation module 1004 computes attribute weights, and similarity computing module 1006 computes similarity of objects with an object of interest. List ordering module 1008 sorts the list of objects based on a measure of similarity to the object of interest. A particular methodology to sort media objects by similarity may be found in co-pending U.S. patent application, entitled "Sorting Media Objects By Similarity", Ser. No. 11/435,494.

Figure 3:
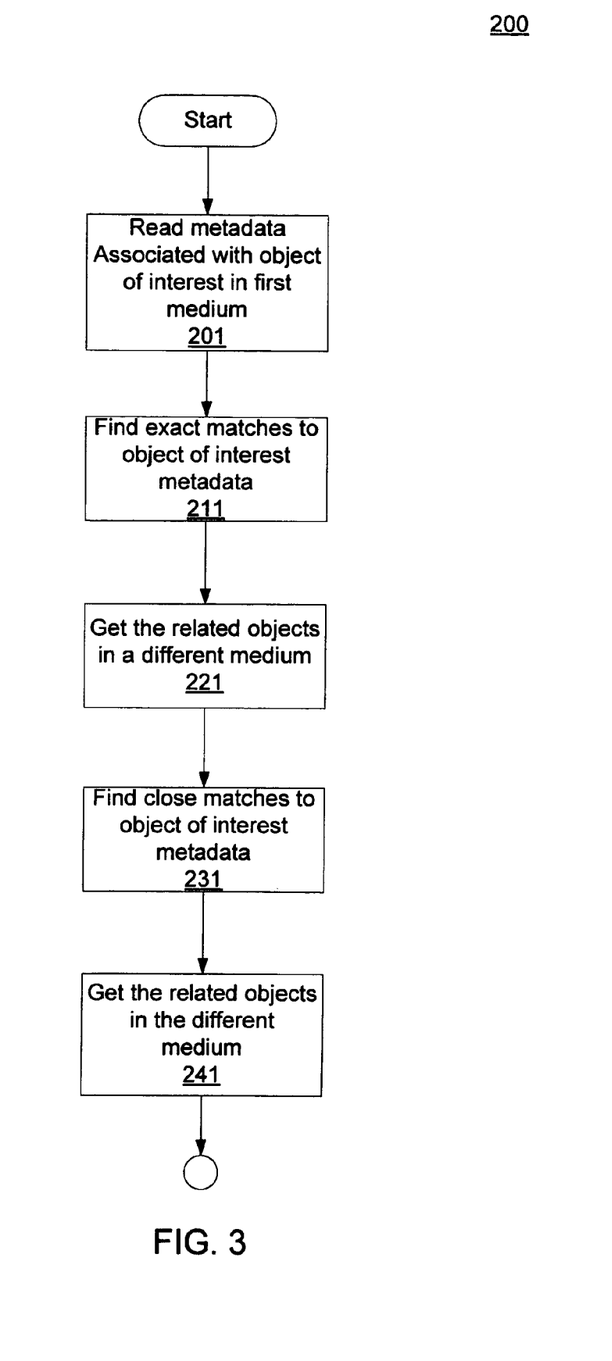
FIGS. 3 and 4 are flow charts of one embodiment of a method for relating objects across various mediums.

One embodiment of a method 300 to be performed by a data analysis module 14 to relate multimedia objects across various mediums is described with reference to a flowchart shown in FIG. 3.

At block 201, the method 200 reads metadata associated with the object of interest. In an embodiment, the metadata is read in dynamically and may be tailored specific to user entered information. For example, the metadata is read in response to a search query by a user. The metadata is in the form of category data 11.

For instance, metadata for a song may include such attributes as "song writer name(s)", "performer name(s)", year of production, genre, name of album and so on. Each attribute may have one or more values. For example, the attribute "song writer name(s)" for the song "Birthday" may have two values—Paul McCartney and John Lennon. The attribute "performer name(s)" for that song may have just one value—the Beatles. The year of production for this song has one value: 1968. The name of album for this song has one value—The White Album. In an embodiment, the artist metadata is generated from an artist metadata database, publicly available sources (Wikipedia®, GRACENOTE®, etc.), and so on. The artist names may be used to search for cross-media objects that may be of interest to a user, e.g., movies.

The metadata may also include name-mapping data, which may map for instance, the name of an artist to various spellings of the name (including common misspellings).

At block 211, the method 300 searches for objects considered relevant to the object of interest in a medium different from that of the object of interest. Accordingly, exact matches for object of interest metadata may be found. For instance, when comparing an artist name related to song of interest to names of artists that appear in soundtracks of movies, the artists' names are represented as strings. Artist name may be mapped to object identifier at distance 0. This means that there is no difference between the artist name related to song of interest and one or more names of artists that appear in soundtracks of movies.

Accordingly, a collection of objects is searched to look for the occurrence of the exact object of interest metadata, e.g., the exact artist name spelling. A list of relevant objects in other mediums is obtained at block 221. In an embodiment, if the list of objects thus obtained is large enough, e.g., greater than a predetermined threshold, the method ends here. Otherwise, the method continues to block 231.

At block 231, the method 200 searches for more objects that are close matches to object of interest metadata. Thus, in the example given above, musical artist's name may be mapped to name at distance 1. Accordingly, the plurality of objects is searched to look for the occurrence of a close object of interest metadata, e.g., the artist name spelling with one letter off.

A list of relevant objects in other mediums may thus be obtained at block 241. In an embodiment, if the list of objects thus obtained is large enough, e.g., greater than a predetermined threshold, the method ends here. Otherwise, the method continues to block 301 of FIG. 4.

One of ordinary skill in the art will appreciate that searching for objects that are not as close matches for object of interest metadata may result in getting mismatches. For example, the artist name spelling with two letters off may result in finding objects for different artists than the one intended.

Figure 4:
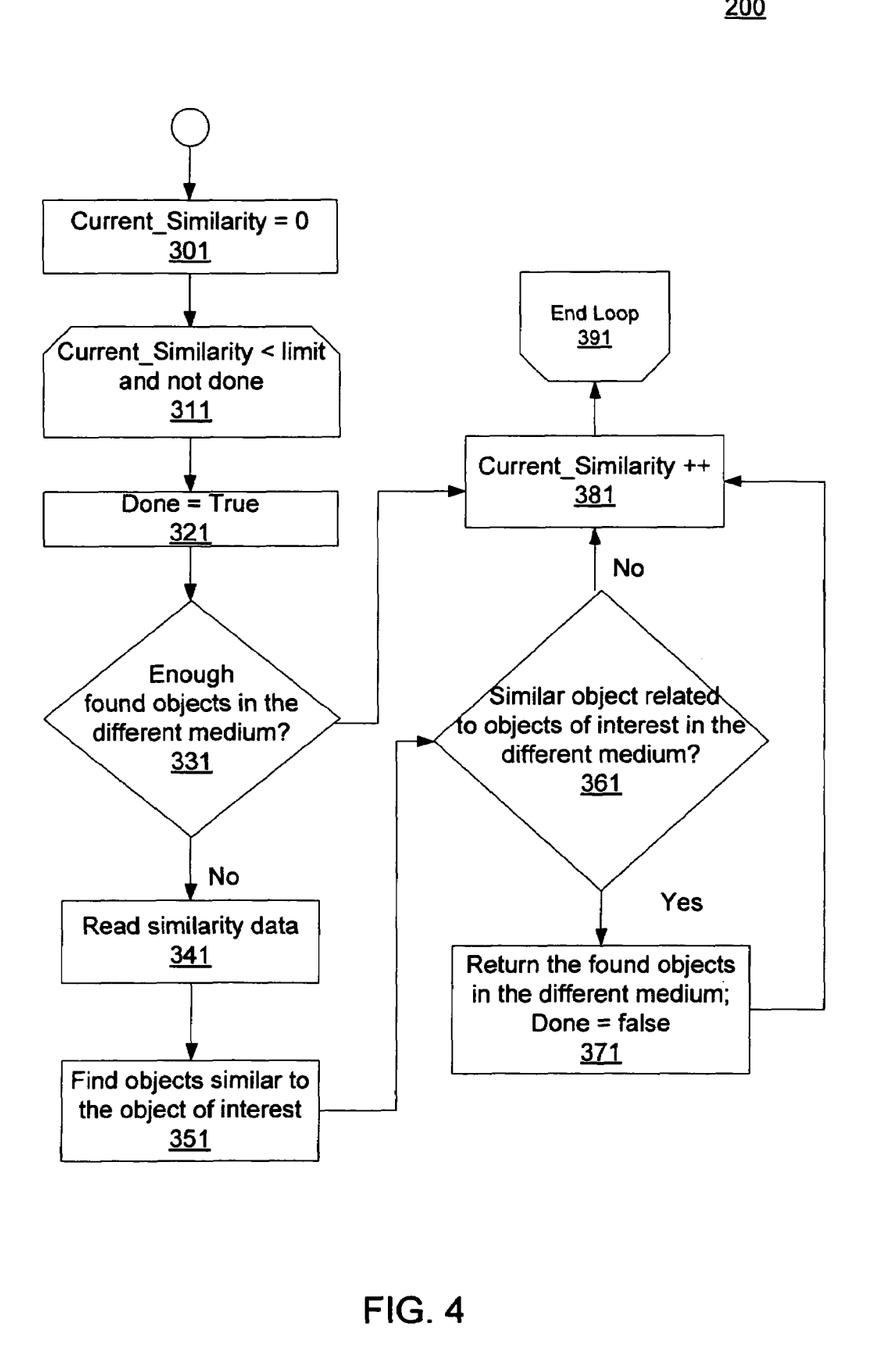

At block 301, a value "current_similarity" is set to zero. At block 311, a loop starts. While current similarity is determined to be less than a predetermined limit and the loop is "not done", at block 321, the value of done is set to true. Having these two restrictions on the loop helps to ensure that the loop does not go on infinitely. The predetermined limit may be set by a user. For instance, the user may specify a limit for search results in a user profile or when performing a search query. Alternatively, the limit may be learned or estimated by the data system 10 based, for instance, on user behavior.

At block 331, it is determined if enough cross-media objects related to the object of interest have been found. If the answer is no, then at block 341, the method 200 reads in similarity data. The similarity data is used to find objects that are considered similar to the object of interest itself at block 351. At block 351, for each object that is considered similar to the selected object, it is determined if the similar object is related to any objects in a medium different from that of the object of interest.

At block 361, the similar object's results are added to the object of interest search results. The loop continues until it is determined that there are enough objects (e.g., movies) relevant to the current artist. In this way, the method 200 finds objects (e.g., movies) even when no cross-media objects come up for an object of interest.

At block 371, the value of current_similarity is incremented and the loop continues until current_similarity is no longer less than the limit and the value of done is false. At block 381, the list of found cross-media objects (e.g., movies) is output to the user.

In an embodiment, similarity among found target objects is used in addition to similarity among object of interest and other objects to enhance results.

In an embodiment, other attributes that are shared by two objects (the object of interest and the target object) are used to enhance results. For example, the year a song was produced may be used to find movies that were also released in the same year.

In an embodiment, attributes of objects are mapped to each other, e.g., a musical genre can be mapped to a movie genre.

Figure 5:
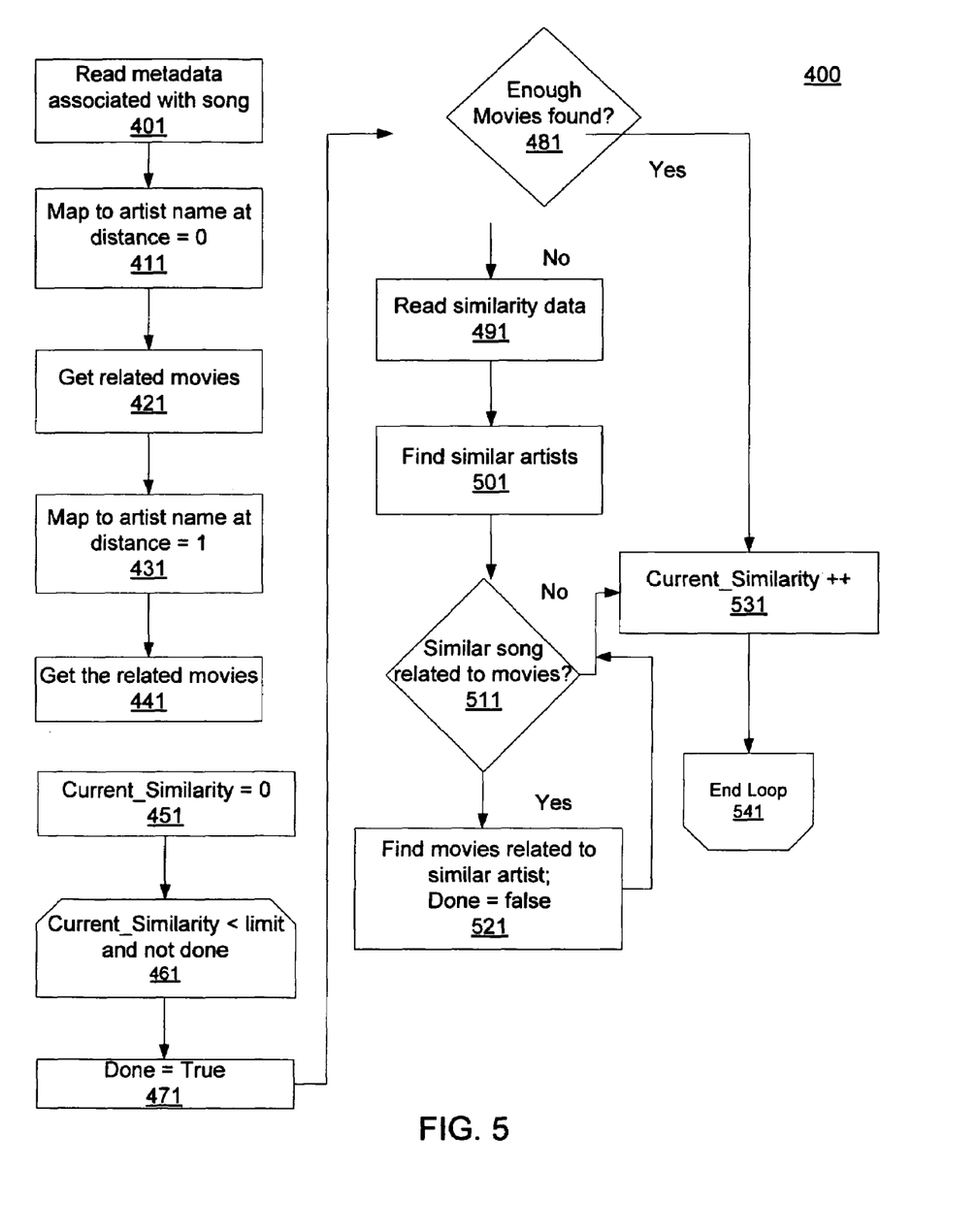
FIG. 5 is a flow chart of one embodiment of a method for relating a song to movies.

One embodiment of a method 400 to be performed by a data analysis module 14 to relate a song to movies is described with reference to flowchart shown in FIG. 5.

At block 401, the method 400 reads metadata related to a song of interest to a user. The metadata may include soundtrack data for each song to which the musical artist contributed, which may include, e.g., song title data, songwriter data for each song, song-performer for each song, genre of song, and so on. The metadata may also include name-mapping data. The metadata may further include similarity data, which may include a list of artists or bands that are considered similar. The method 400 finds movies related to all artists of the song of interest to the user.

For each artist, the method 400, at block 411, maps to name at distance 0. Accordingly, each time the artist's name exactly appears in the soundtrack of another movie, the movie is considered relevant. For example, all songs that contain in their metadata the string "John Lennon" are considered relevant. A list of relevant movies may be obtained at block 421. In an embodiment, if the list of movies is large enough, e.g., greater than a predetermined threshold, the method ends here. Otherwise, the method continues to block 431.

At block 431, for each artist, the method 400, maps to name at distance 1. For example, all songs that contain in their metadata the string "John Lannon" are considered relevant. A list of relevant movies may be thus obtained at block 441. At block 451, current_similarity is set to zero. While current similarity is determined to be less than a predetermined limit and a loop is not finished, for the selected artist, at block 461, it is determined if enough movies have been found at block 481. If the answer is no, then similarity metadata is read in at block 491 and used to find artists that are considered similar to the artist of the song of interest to user at block 501. Artists considered similar to an artist of interest may be determined by device 18 that sorts media objects by similarity if they have the same measure of similarity (e.g., a rank). For example, the similarity metadata may indicate that the musical artist George Harrison is similar to John Lennon.

At block 511, for each artist that is considered similar, it is determined if the artist is related to any movies. Thus, movies may be found for George Harrison. Movies may be found in the same way as for the original artist of interest. At block 521, the similar artist's movies are added to the current artist movie list. The loop continues until it is determined that there are enough movies relevant to the current artist. In this way, the method 400 finds movies even when no movies come up for a musical artist of interest to a user.

At block 511, the value of current_similarity is incremented and the loop continues until current similarity is no longer less than the limit and the value of done is false. A list of movies is output to the user. The method 400 continues for each artist included in the metadata of the song of interest to find movies of potential interest to the user.

Figure 6:
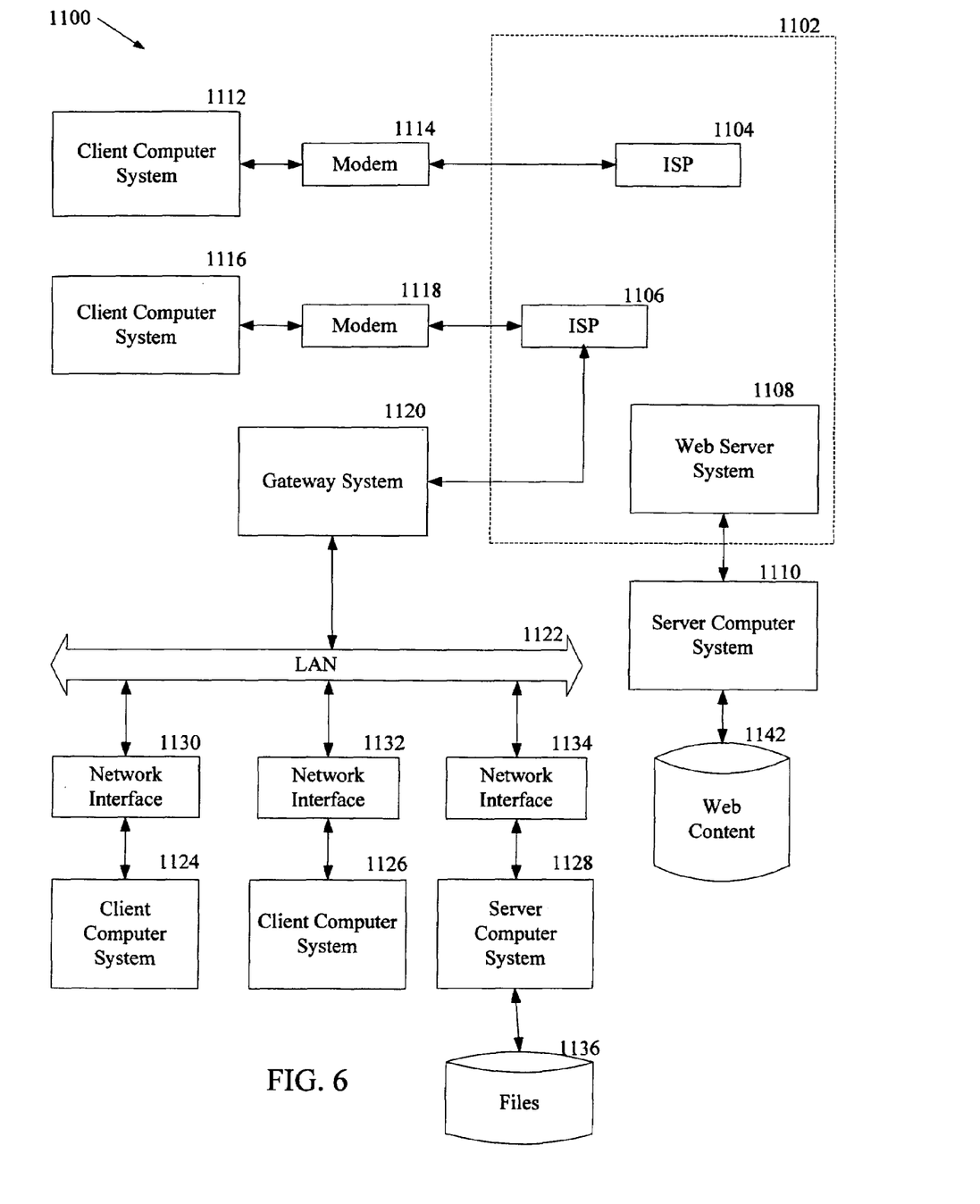
FIG. 6 is a diagram of one embodiment of an operating environment suitable for practicing the present invention.
Figure 7:
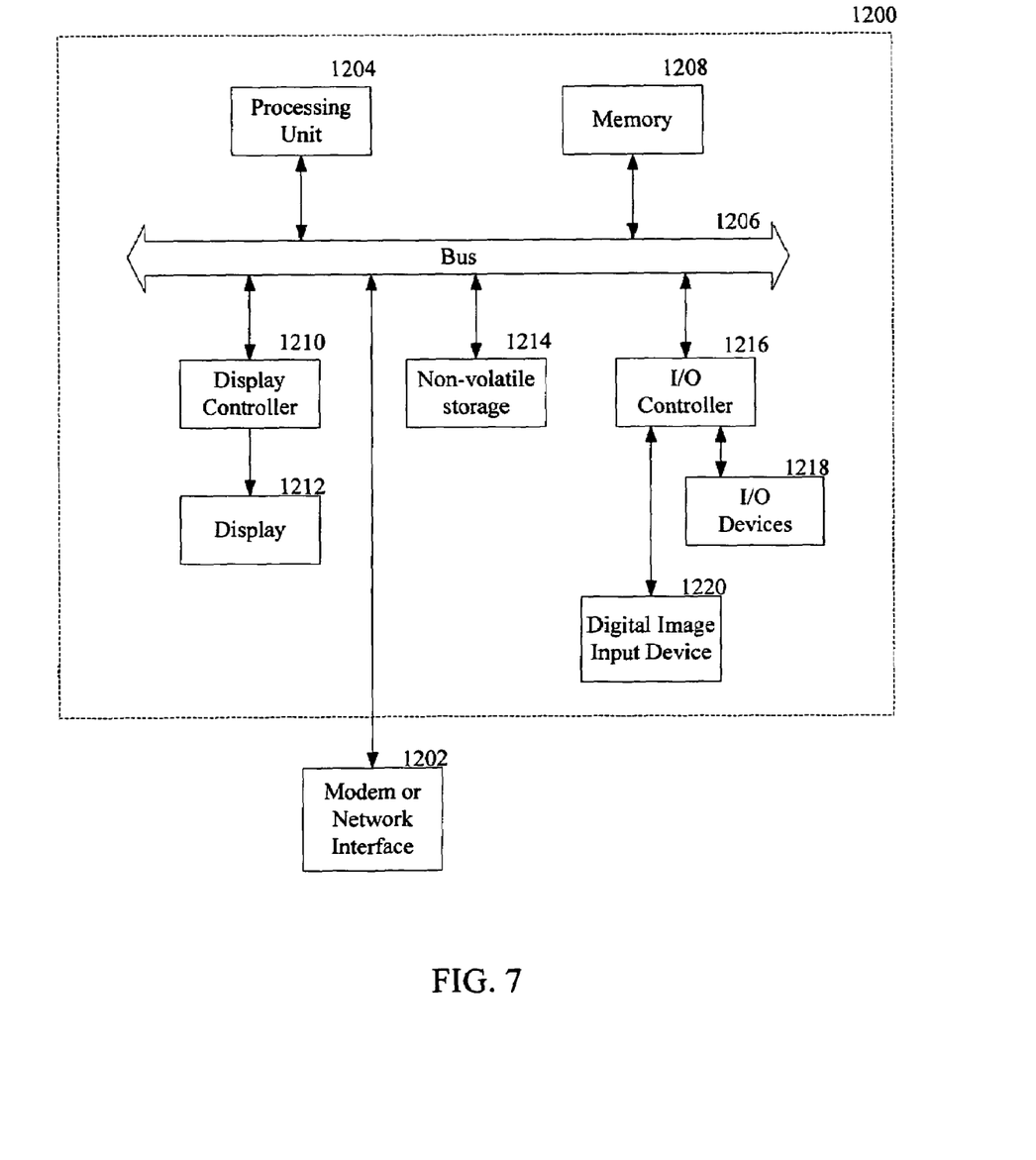
FIG. 7 a diagram of one embodiment of a computer system suitable for use in the operating environment of FIGS. 3-5.

The following description of FIGS. 6 and 7 is intended to provide an overview of computer hardware and other operating components suitable for performing the methods of the invention described above, but is not intended to limit the applicable environments. One of skill in the art will immediately appreciate that the embodiments of the invention can be practiced with other computer system configurations, including set-top boxes, hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

In practice, the methods described herein may constitute one or more programs made up of machine-executable instructions. Describing the method with reference to the flowchart in FIGS. 3-5 enables one skilled in the art to develop such programs, including such instructions to carry out the operations (acts) represented by logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein.

FIG. 6 shows several computer systems 1100 that are coupled together through a network 1102, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 1102 is typically provided by Internet service providers (ISP), such as the ISPs 1104 and 1106. Users on client systems, such as client computer systems 1112, 1116, 1124, and 1126 obtain access to the Internet through the Internet service providers, such as ISPs 1104 and 1106. Access to the Internet allows users of the client computer systems to exchange information, receive and send e-mails, and view documents, such as documents which have been prepared in the HTML format. These documents are often provided by web servers, such as web server 1108 which is considered to be "on" the Internet. Often these web servers are provided by the ISPs, such as ISP 1104, although a computer system can be set up and connected to the Internet without that system being also an ISP as is well known in the art.

The web server 1108 is typically at least one computer system which operates as a server computer system and is configured to operate with the protocols of the World Wide Web and is coupled to the Internet. Optionally, the web server 1108 can be part of an ISP which provides access to the Internet for client systems. The web server 1108 is shown coupled to the server computer system 1110 which itself is coupled to web content 842, which can be considered a form of a media database. It will be appreciated that while two computer systems 1108 and 1110 are shown in FIG. 6, the web server system 1108 and the server computer system 1110 can be one computer system having different software components providing the web server functionality and the server functionality provided by the server computer system 1110 which will be described further below.

Client computer systems 1112, 1116, 1124, and 1126 can each, with the appropriate web browsing software, view HTML pages provided by the web server 1108. The ISP 1104 provides Internet connectivity to the client computer system 1112 through the modem interface 1114 which can be considered part of the client computer system 1112. The client computer system can be a personal computer system, a network computer, a Web TV system, a handheld device, or other such computer system. Similarly, the ISP 1106 provides Internet connectivity for client systems 1116, 1124, and 1126, although as shown in FIG. 6, the connections are not the same for these three computer systems. Client computer system 1116 is coupled through a modem interface 1118 while client computer systems 1124 and 1126 are part of a LAN. While FIG. 6 shows the interfaces 1114 and 1118 as generically as a "modem," it will be appreciated that each of these interfaces can be an analog modem, ISDN modem, cable modem, satellite transmission interface, or other interfaces for coupling a computer system to other computer systems. Client computer systems 1124 and 1116 are coupled to a LAN 1122 through network interfaces 1130 and 1132, which can be Ethernet network or other network interfaces. The LAN 1122 is also coupled to a gateway computer system 1120 which can provide firewall and other Internet related services for the local area network. This gateway computer system 1120 is coupled to the ISP 1106 to provide Internet connectivity to the client computer systems 1124 and 1126. The gateway computer system 1120 can be a conventional server computer system. Also, the web server system 1108 can be a conventional server computer system.

Alternatively, as well-known, a server computer system 1128 can be directly coupled to the LAN 1122 through a network interface 1134 to provide files 1136 and other services to the clients 1124, 1126, without the need to connect to the Internet through the gateway system 1120. Furthermore, any combination of client systems 1112, 1116, 1124, 1126 may be connected together in a peer-to-peer network using LAN 1122, Internet 1102 or a combination as a communications medium. Generally, a peer-to-peer network distributes data across a network of multiple machines for storage and retrieval without the use of a central server or servers. Thus, each peer network node may incorporate the functions of both the client and the server described above.

FIG. 7 shows one example of a conventional computer system that can be used as encoder or a decoder. The computer system 1200 interfaces to external systems through the modem or network interface 1202. It will be appreciated that the modem or network interface 1202 can be considered to be part of the computer system 1200. This interface 1202 can be an analog modem, ISDN modem, cable modem, token ring interface, satellite transmission interface, or other interfaces for coupling a computer system to other computer systems. The computer system 1202 includes a processing unit 1204, which can be a conventional microprocessor such as an Intel Pentium microprocessor or Motorola Power PC microprocessor. Memory 1208 is coupled to the processor 1204 by a bus 1206. Memory 1208 can be dynamic random access memory (DRAM) and can also include static RAM (SRAM). The bus 1206 couples the processor 1204 to the memory 1208 and also to non-volatile storage 1214 and to display controller 1210 and to the input/output (I/O) controller 1216. The display controller 1210 controls in the conventional manner a display on a display device 1212 which can be a cathode ray tube (CRT) or liquid crystal display (LCD). The input/output devices 1218 can include a keyboard, disk drives, printers, a scanner, and other input and output devices, including a mouse or other pointing device. The display controller 1210 and the I/O controller 1216 can be implemented with conventional well known technology. A digital image input device 1220 can be a digital camera which is coupled to an I/O controller 1216 in order to allow images from the digital camera to be input into the computer system 1200. The non-volatile storage 1214 is often a magnetic hard disk, an optical disk, or another form of storage for large amounts of data. Some of this data is often written, by a direct memory access process, into memory 1208 during execution of software in the computer system 1200. One of skill in the art will immediately recognize that the terms "computer-readable medium" and "machine-readable medium" include any type of storage device that is accessible by the processor 1204 and also encompass a carrier wave that encodes a data signal.

Network computers are another type of computer system that can be used with the embodiments of the present invention. Network computers do not usually include a hard disk or other mass storage, and the executable programs are loaded from a network connection into the memory 1208 for execution by the processor 1204. A Web TV system, which is known in the art, is also considered to be a computer system according to the embodiments of the present invention, but it may lack some of the features shown in FIG. 7, such as certain input or output devices. A typical computer system will usually include at least a processor, memory, and a bus coupling the memory to the processor.

It will be appreciated that the computer system 1200 is one example of many possible computer systems, which have different architectures. For example, personal computers based on an Intel microprocessor often have multiple buses, one of which can be an input/output (I/O) bus for the peripherals and one that directly connects the processor 1204 and the memory 1208 (often referred to as a memory bus). The buses are connected together through bridge components that perform any necessary translation due to differing bus protocols.

It will also be appreciated that the computer system 1200 is controlled by operating system software, which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 1214 and causes the processor 1204 to execute the various acts required by the operating system to input and output data and to store data in memory, including storing files on the non-volatile storage 1214.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computerized method comprising:
receiving a second multimedia object;
mapping, by an automatic recommendation computer, a current piece of metadata included in the second multimedia object in a second multimedia medium to a modified piece of metadata using similarity data, wherein the modified piece of metadata is similar to the current piece of metadata and the metadata comprises category data and the similarity data includes a list of modifications to the current piece of metadata that are considered similar;
searching a first multimedia medium for a first multimedia object using the modified piece of metadata, wherein the first and second multimedia mediums are different types of multimedia.

2. The computerized method of claim 1 further comprising:
searching the second multimedia medium for a third multimedia object that has similar metadata to the second multimedia object; and
searching the first multimedia medium for a fourth multimedia object using metadata associated with the third multimedia object.

3. The computerized method of claim 1, wherein the first multimedia object is a movie and the first multimedia object is a song.

4. The computerized method of 3, wherein the metadata associated with the song comprises artist name, year of production, genre, name of album.

5. The method of claim 1, wherein the modified and current pieces of metadata are similar when there is a difference in one of the characteristics of the modified and current pieces of metadata.

6. The method of claim 1, wherein the characteristic difference is one of a letter difference between the modified and current pieces of metadata, and when the modified piece of metadata is a first artist and the current piece of metadata is a second artist and the first and second artists are similar.

7. A machine-readable storage medium having executable instructions to cause a processor to perform a method, the method comprising:
receiving a second multimedia object;
mapping a current piece of metadata included in the second multimedia object in a second multimedia medium to a modified piece of metadata using similarity data, wherein the modified piece of metadata is similar to the current piece of metadata and the metadata comprises category data and the similarity data includes a list of modifications to the current piece of metadata that are considered similar;
searching a first multimedia medium for a first multimedia object using the modified piece of metadata, wherein and the first and second multimedia mediums are different types of multimedia.

8. The machine-readable storage medium of claim 7, wherein the method further comprises:
  searching the second multimedia medium for a third multimedia object that has similar metadata to the second multimedia object; and
  searching the first multimedia medium for a fourth multimedia object using metadata associated with the third multimedia object.

9. The machine-readable storage medium of claim 7, wherein the first multimedia object is a movie and the first multimedia object is a song.

10. The machine-readable storage medium of 9, wherein the metadata associated with the song comprises artist name, year of production, genre, name of album.

11. The machine-readable storage medium of claim 7, wherein the modified and current pieces of metadata are similar when there is a difference in one of the characteristics of the modified and current pieces of metadata.

12. The machine-readable storage medium of claim 7, wherein the characteristic difference is one of a letter difference between the modified and current pieces of metadata, and when the modified piece of metadata is a first artist and the current piece of metadata is a second artist and the first and second artists are similar.

13. A computer system comprising:
  a processor coupled to a memory through a bus; and
  a process executed from the memory by the processor to cause the processor to:
    receive a second multimedia object,
    map a current piece of metadata included in the second multimedia object in a second multimedia medium to a modified piece of metadata using similarity data, wherein the modified piece of metadata is similar to the current piece of metadata and the metadata comprises category data and the similarity data includes a list of modifications to the current piece of metadata that are considered similar, and
    search a first multimedia medium for a first object using the modified piece of metadata, wherein the first and second multimedia mediums are different types of multimedia.

14. The system of claim 13, wherein the process further causes the processor to:
  search the second multimedia medium for a third multimedia object that has similar metadata to the second multimedia object; and
  search the first multimedia medium for a fourth multimedia object using metadata associated with the third multimedia object.

15. The computer system of claim 13, wherein the modified piece of metadata has at least one letter different than the current piece of metadata.

16. The computer system of claim 13, wherein the characteristic difference is one of a letter difference between the modified and current pieces of metadata, and when the modified piece of metadata is a first artist and the current piece of metadata is a second artist and the first and second artists are similar.

17. An apparatus comprising:
  means for receiving a second multimedia object;
  means for mapping a current piece of metadata included in the second multimedia object in a second multimedia medium to a modified piece of metadata using similarity data, wherein the modified piece of metadata is similar to the current piece of metadata and the metadata comprises category data and the similarity data includes a list of modifications to the current piece of metadata that are considered similar;
  means for searching a first multimedia medium for a first multimedia object using the modified piece of metadata, wherein the first and second multimedia mediums are different types of multimedia; and
  means for outputting the first multimedia object.

18. The apparatus of claim 17, further comprising:
  means for searching the second multimedia medium for a third multimedia object that has similar metadata to the second multimedia object; and
  means for searching the first multimedia medium for a fourth multimedia object using metadata associated with the third multimedia object.

19. The apparatus of claim 17, wherein the multimedia object is a movie and the first object is a song.

20. The apparatus of claim 19, wherein the metadata associated with the song comprises artist name, year of production, genre, and name of album.

* * * * *